H. JARVIS.
WATER HEATER.
APPLICATION FILED JAN. 29, 1914.

1,129,870.

Patented Mar. 2, 1915.

Witnesses.

Inventor.
Harold Jarvis,

UNITED STATES PATENT OFFICE.

HAROLD JARVIS, OF TORONTO, ONTARIO, CANADA.

WATER-HEATER.

1,129,870.     Specification of Letters Patent.     Patented Mar. 2, 1915.

Application filed January 29, 1914. Serial No. 815,163.

*To all whom it may concern:*

Be it known that I, HAROLD JARVIS, a citizen of the United States, and resident of the city of Toronto, county of York, Province of Ontario, in the Dominion of Canada, have invented certain new and useful Improvements in Water-Heaters, described in the following specification and illustrated in the accompanying drawings, that form part of the same.

The principal objects of the invention are, to devise a form of gas water heater which will heat a supply of water very rapidly, will be of very simple and durable construction, and may be manufactured at extremely low cost.

A further object of the present invention is, to utilize to the greatest possible extent the thermal value of the gas consumed.

The principal feature of the invention consists in the novel construction and arrangement of parts whereby the heat generated from the burning gases is retained in active contact with the water heating surfaces for the maximum period, the heat being baffled in its outward flow.

Figure 1:
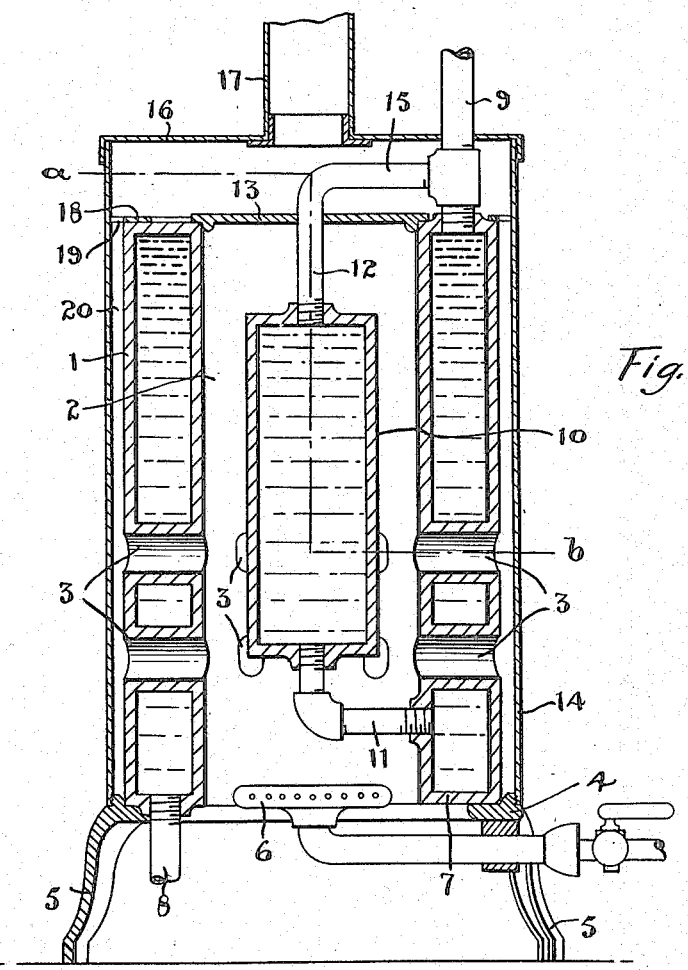
Figure 2:
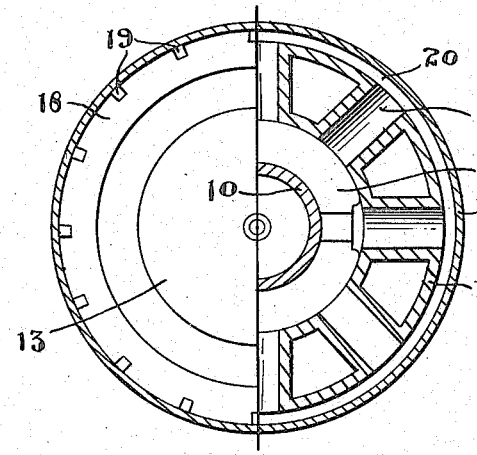

In the drawings, Figure 1 is a vertical mid-sectional view. Fig. 2 is a horizontal sectional view taken on the line $a$—$b$ Fig. 1.

Like numerals of reference indicate corresponding parts in each figure.

Referring to the drawings, 1 is a double walled hollow cylindrical casing having the central cylindrical chamber 2 and a plurality of radially arranged openings 3 extending through the walls of said casing forming passages for the outward flow of the burnt gases, said casing 1 forming the annular water heating chamber. The casing 1 is supported upon a suitable base here shown as a ring 4 having the legs 5 extending downwardly therefrom.

6 is a gas burner which is rigidly supported from the base and is preferably of a disk type having holes in the periphery projecting the flames horizontally therefrom. The burner is preferably arranged in such position within the bottom of the casing 1 that the flames projecting therefrom will strike against the lowermost portion of the said casing opposite to the closed bottom 7. This particular feature is, I consider, very important in the quick heating of the water.

8 is a water supply pipe leading into the bottom of the casing 1 and 9 is a hot water pipe leading from the top of said casing and preferably arranged to enter diametrically opposite to the intake.

10 is a small closed cylindrical casing arranged centrally within the cylindrical chamber 2 about mid-way of its length and having a pipe 11 connected to the bottom thereof and leading into the inner wall of the cylindrical casing 1 a short distance above the bottom.

12 is a pipe leading from the top of the casing 10 and extending upwardly beyond the top of the casing 1 and there connected with the hot water pipe 9 leading from said casing 1.

13 is a cover plate closing the top of the cylindrical chamber 2 preventing the egress at this point of the hot gases rising from the burner.

14 is an outer cylindrical shell of thin sheet metal supported upon the base 4 and spaced a short distance from the outer wall of the casing 1, said shell rising above the top of said casing 1 and preferably closing in the lateral extension 15 of the pipe 12.

16 is a cap closing the top of the shell 14 having a vent pipe 17 leading preferably from the center thereof.

18 is a flat ring of thin metal preferably sheet metal resting upon the top of the casing 1 and projecting beyond the outer edge thereof and engaging the inner wall of the shell 14, said ring having a plurality of narrow slots 19 cut in its outer edge and communicating with the annular space 20 inclosing between the shell 14 and the casing 1.

In the operation and use of this burner, upon the gas being lighted the heat of the flames emanating therefrom strikes first against the bottom portion of the casing 1 getting the metal thoroughly heated in a very short space of time. Immediately the metal of the casing 1 becomes heated the circulation of the water within the annular chamber inclosed by said casing commences. The hot gases rising within the cylindrical chamber 2 and surrounding the small cylinder 10 heat the small quantity of water contained within said small cylinder 10 very rapidly and the water heated therein rising through the pipe 12 and passing outwardly through the hot water pipe 9 to the usual tank starts a supply of hot water at high temperature. The hot gases rising upwardly along the inner wall of the casing 1 are prevented from escaping at the top through the natural rise due to the heat by the plate 13 and being thus baffled the heat is thrown back and concentrated upon the central cylinder and eventually finds egress through the radial passages 3. The hot gases then pass upwardly around the periphery of the casing 1, being confined by the outer shell 14, and the rising gases are again baffled at the top of the annular chamber surrounding the cylinder 1 by the ring plate 18. The slots 19 are small but of sufficient area to allow the escape of sufficient of the products of combustion to prevent the forcing back of carbon monoxid which may be formed within the heater allowing such poisonous gases to escape through the vent pipe 17. The gases in escaping are however confined and drawn over the top of the casing 1 so that absorbed to the greatest possible extent the thermal units of the gas will be given off and therefore, the water within the annular casing 1 will be heated very rapidly and will circulate the water from the tank in the ordinary manner placing in such tank a supply ready for use.

It will be readily understood from this description that a heater constructed in a manner described is of very simple construction and the cost of manufacture will be very low.

A very important feature is that the burner is so arranged that the flames strike against the solid metal of the bottom of the casing in preference to striking the wall of the casing higher up as I find in practice that the best and most rapid results in heating the water are obtained by not directing the flames directly against the wall of the casing contacting with the water.

What I claim as my invention is:—

1. In a water heater, a casing forming an annular water chamber having a closed top and flue passages through the side walls adjacent to the lower end, a burner arranged centrally of said casing, an outer shell surrounding and spaced from the outer wall of said casing and extending over the top thereof and having a flue at the top, and a baffle ring arranged at the top of said casing partly closing the annular space between the outer wall of said casing and said shell.

2. In a water heater, a casing forming an annular water chamber having a closed top and flue passages through the side walls, a burner arranged centrally of said casing, an outer shell surrounding and spaced from the outer wall of said casing and extending over the top thereof and having a flue at the top, and a baffle ring resting on the top of said casing extending across the annular space between the casing and the shell and having a plurality of small openings therethrough adapted to form passages for the products of combustion.

3. In a water heater, a casing forming an annular water chamber closed at the top and having a plurality of rows of radially arranged openings through the side walls forming flue passages, an outer shell surrounding and spaced from said casing and rising above the top thereof and having a cap closing the top and a flue leading therefrom, and a burner surrounded by said annular casing having gas openings in the side walls projecting the flame horizontally against the wall of the casing.

Signed at the city of Toronto, Ontario, Canada, this 19th day of January, 1914.

HAROLD JARVIS.

Witnesses:
E. HERON,
A. G. KELLY.